(12) United States Patent
Yoshida et al.

(10) Patent No.: US 9,197,410 B2
(45) Date of Patent: Nov. 24, 2015

(54) KEY MANAGEMENT SYSTEM

(71) Applicant: Kabushiki Kaisha Toshiba, Minato-ku (JP)

(72) Inventors: Takuya Yoshida, Inagi (JP); Yoshihiro Fujii, Fuchu (JP)

(73) Assignees: KABUSHIKI KAISHA TOSHIBA, Minato-ku (JP); TOSHIBA SOLUTIONS CORPORATION, Minato-ku (JP)

( * ) Notice: Subject to any disclaimer, the term of this patent is extended or adjusted under 35 U.S.C. 154(b) by 147 days.

(21) Appl. No.: 13/968,885

(22) Filed: Aug. 16, 2013

(65) Prior Publication Data
US 2014/0161251 A1 Jun. 12, 2014

Related U.S. Application Data

(63) Continuation of application No. PCT/JP2012/053546, filed on Feb. 15, 2012.

(30) Foreign Application Priority Data

Feb. 17, 2011 (JP) .................. 2011-032078

(51) Int. Cl.
*H04L 29/06* (2006.01)
*H04L 9/08* (2006.01)
(Continued)

(52) U.S. Cl.
CPC ............ *H04L 9/0861* (2013.01); *G06F 21/602* (2013.01); *G06F 21/62* (2013.01);
(Continued)

(58) Field of Classification Search
CPC ..... H04L 9/0861; H04L 9/0827; H04L 63/06; H04L 9/14; H04L 9/0825; H04L 2209/76; G06F 21/602; G06F 21/62

USPC .......................................................... 380/44
See application file for complete search history.

(56) References Cited

U.S. PATENT DOCUMENTS 6,957,330 B1 10/2005 Hughes
7,454,021 B2 * 11/2008 Reddy et al. .................. 380/282
(Continued)

FOREIGN PATENT DOCUMENTS

EP 0 833 241 A2 4/1998
WO WO 00/52558 A1 9/2000

OTHER PUBLICATIONS

Extended Search Report issued Jul. 7, 2014 in European Patent Application No. 12746655.5.
(Continued)

*Primary Examiner* — Jeffrey Pwu
*Assistant Examiner* — William Corum, Jr.
(74) *Attorney, Agent, or Firm* — Oblon, McClelland, Maier & Neustadt, L.L.P.

(57) ABSTRACT

According to one embodiment, a master key management device generates, by using a first secret key stored in a first storage unit and a third public key, a re-encryption key used to re-encrypt a second secret key which is stored in a second storage unit and which is encrypted with a first public key to the second secret key encrypted with the third public key. A key management server device receives the generated re-encryption key from the master key management device while the master key management device and the key management server device are connected to each other, and stores the received re-encryption key in a third storage unit. The master key management device and the key management server device are disconnected after the re-encryption key is stored in the third storage unit.

3 Claims, 9 Drawing Sheets

(51) Int. Cl.
G06F 21/62 (2013.01)
H04L 9/14 (2006.01)
G06F 21/60 (2013.01)

(52) U.S. Cl.
CPC ........... *H04L 9/0825* (2013.01); *H04L 9/0827* (2013.01); *H04L 9/14* (2013.01); *H04L 63/06* (2013.01); *H04L 2209/76* (2013.01)

(56) References Cited

U.S. PATENT DOCUMENTS

| | | | | |
|---|---|---|---|---|
| 2008/0059787 | A1* | 3/2008 | Hohenberger et al. | 713/153 |
| 2008/0170701 | A1* | 7/2008 | Matsuo et al. | 380/281 |
| 2010/0138671 | A1* | 6/2010 | Kim et al. | 713/189 |
| 2014/0140514 | A1* | 5/2014 | Gentry | 380/281 |

OTHER PUBLICATIONS

International Search Report mailed Mar. 27, 2012, in PCT/JP2012/053546 filed Feb. 15, 2012 (with English Translation).
International Written Opinion mailed Mar. 27, 2012, in PCT/JP2012/053546 filed Feb. 15, 2012.
Giuseppe Ateniese, et al., Improved proxy re-encryption schemes with applications to secure distributed storage (2005), Mar. 14, 2012, <URL:http://citeseer.ist.psu.edu/viewdoc/summary?doi=10.1.1.100.7790>, 18 pages.
Benoit Libert, et al., "Unidirectional Chosen-Ciphertext Secure Proxy Re-Encryption", Mar. 14, 2012, <URL:http://hal.inria.fr/inria-00339530/en/>, 29 pages.
Benoit Libert, et al., "Tracing Malicious Proxies in Proxy Re-Encryption", Mar. 14, 2012, http://hal.inria.fr/inria-00327353/. 21 pages.
Jun Shao, et al., "CCA-Secure Proxy Re-Encryption without Pairings", Mar. 14, 2012, http://www.iacr.org/archive/pkc2009/pkc2009.html, 24 pages.
Jian Weng, et al., "Conditional Proxy Re-Encryption Secure against Chosen-Ciphertext Attack", ASIACCS 2009, Proceedings of the 4th International Symposium on Information, Computer and Communications Security, Mar. 2009, pp. 322-332.
Luan Ibraimi, et al., "An Encryption Scheme for a Secure Policy Updating", Proceedings of the 2010 International Conference on Security and Cryptography, IEEE, Jul. 2010, 11 pages.
Giuseppe Ateniese, et al. "Improved Proxy Re-encryption Schemes with Applications to Secure Distributed Storage", ACM Transactions on Information and System Security, vol. 9, No. 1, Feb. 2006, pp. 1-30.
Singapore Search Report and Written Opinion issued Jan. 6, 2014 in Singapore Patent Application No. 201306264-1 (submitting English language translation only).

* cited by examiner

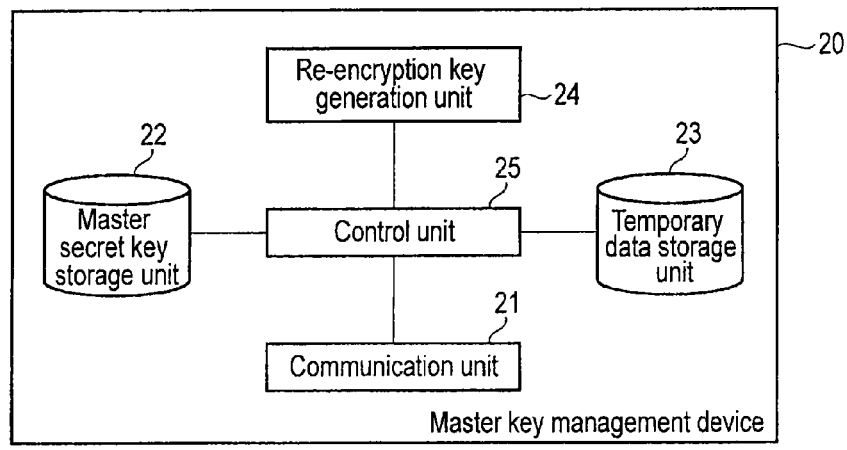
F I G. 3
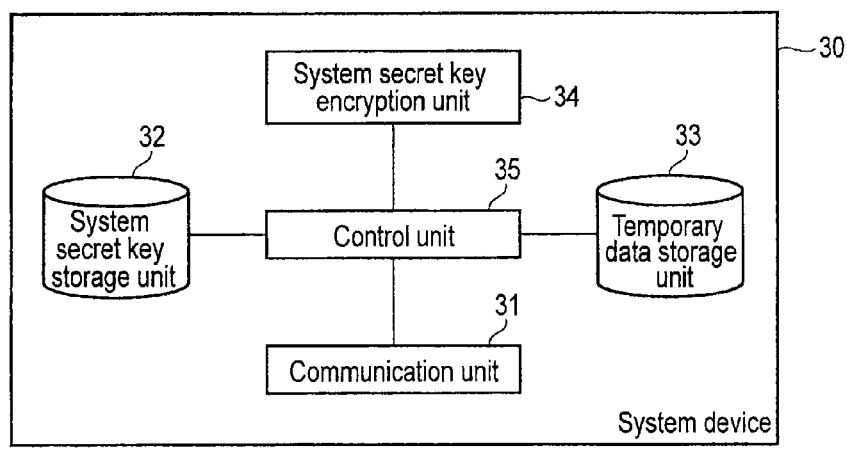
F I G. 4

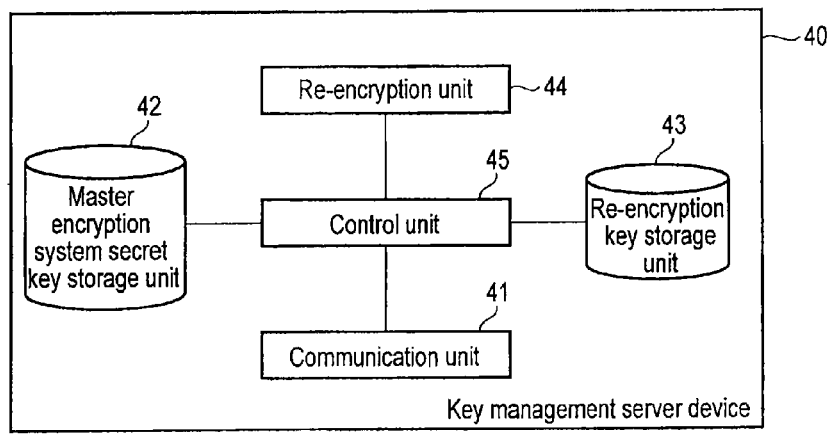
F I G. 5
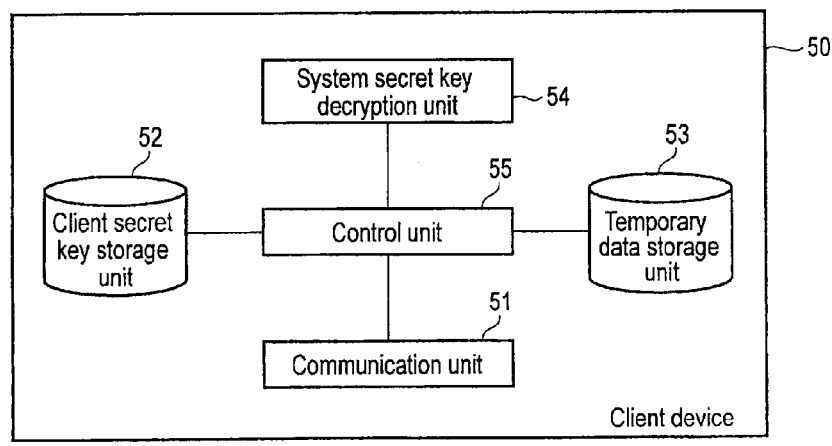
F I G. 6

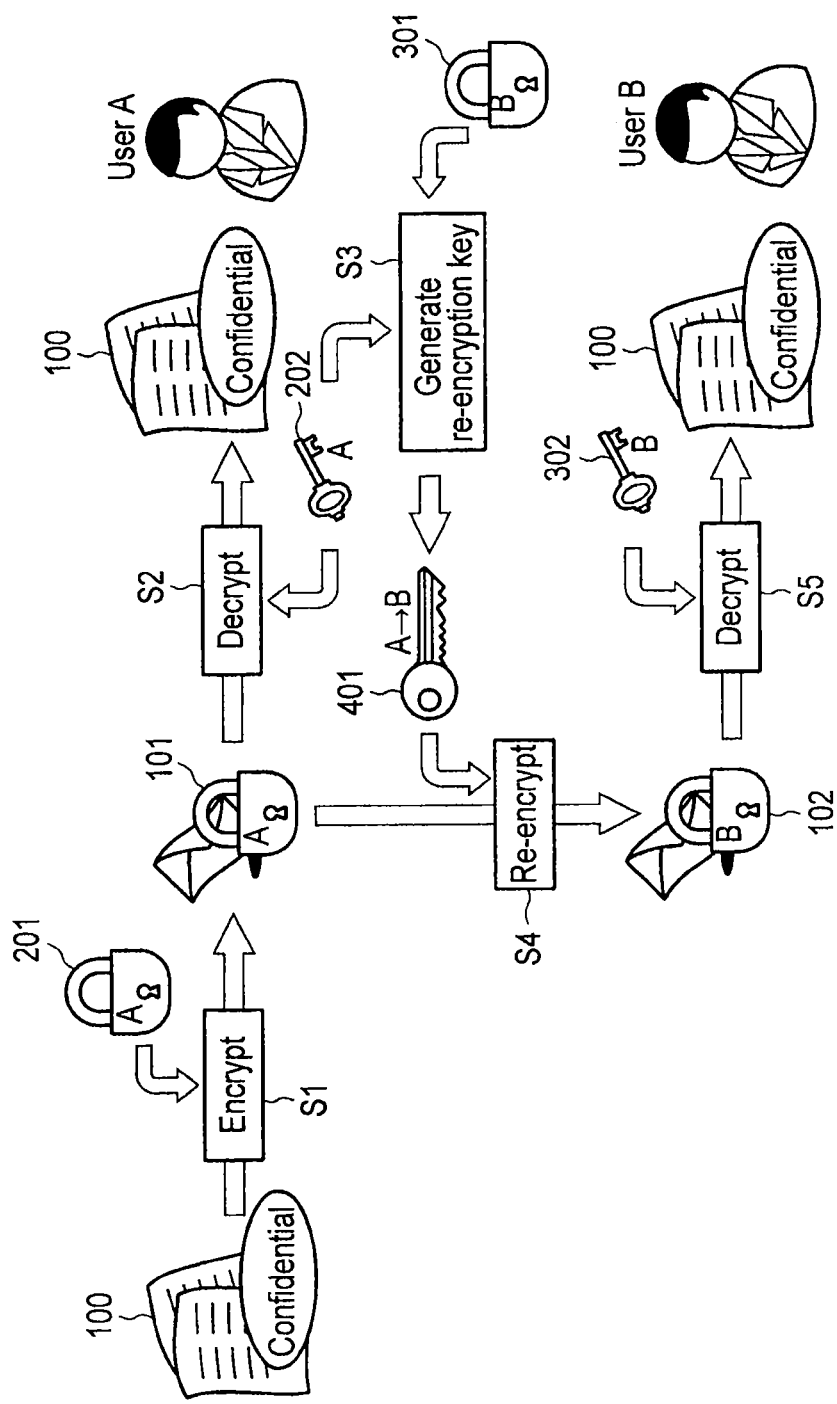
F I G. 7

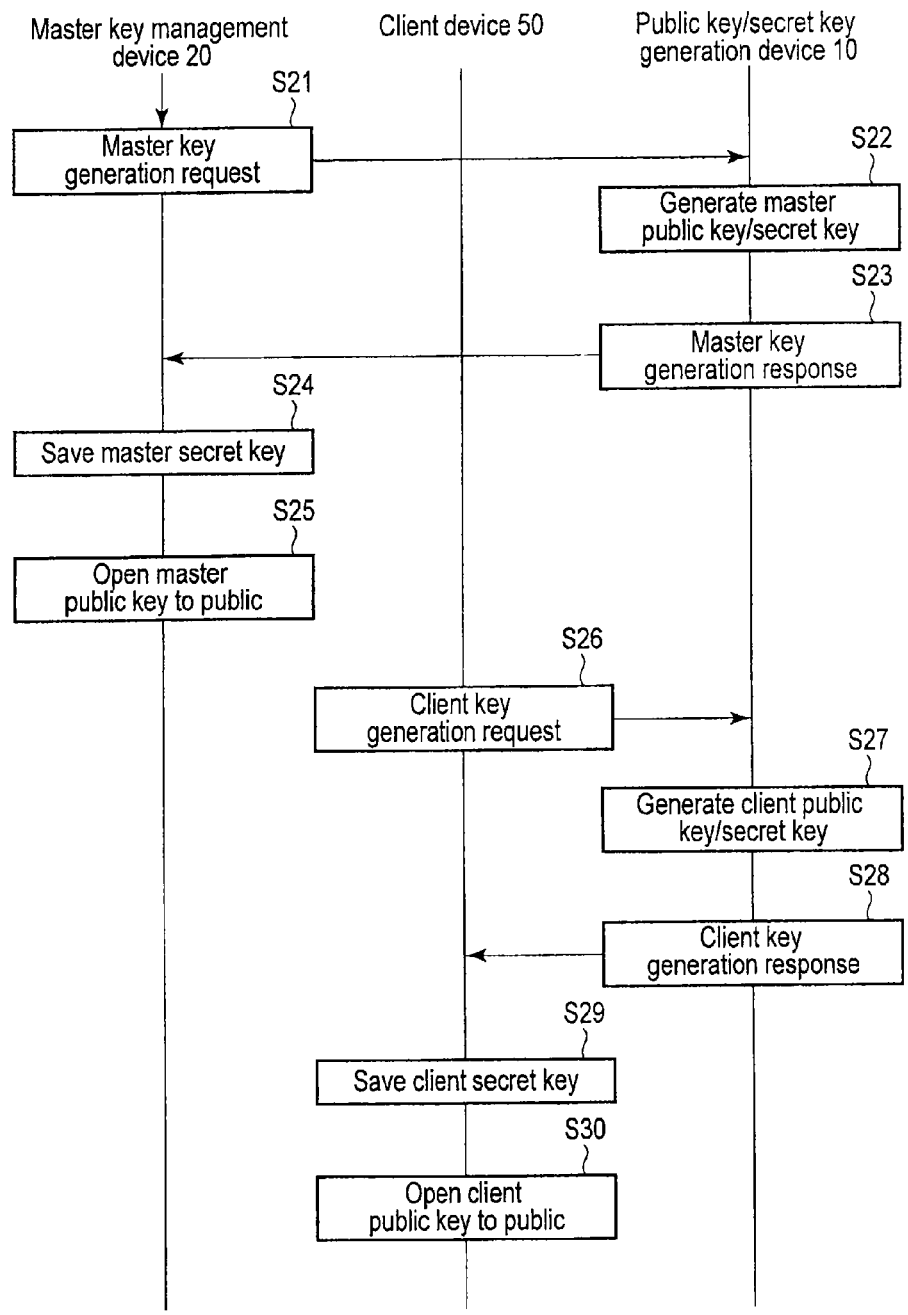
F I G. 9

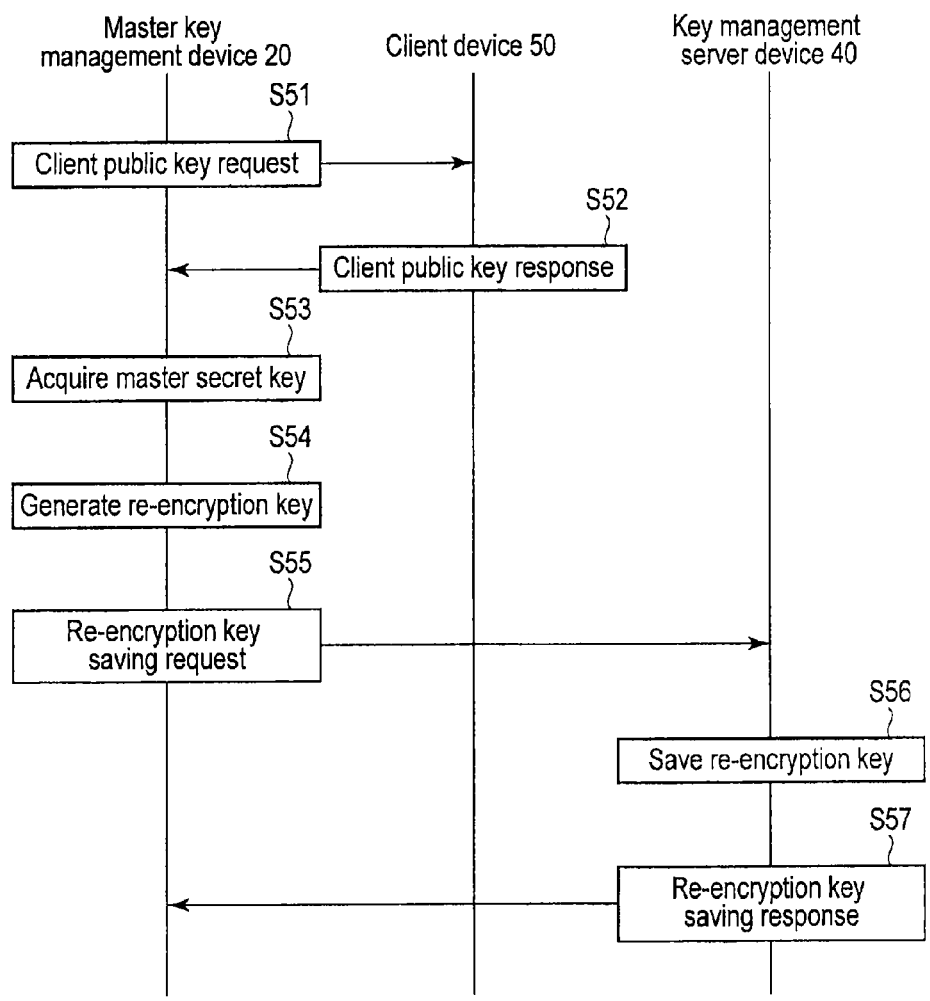
F I G. 11

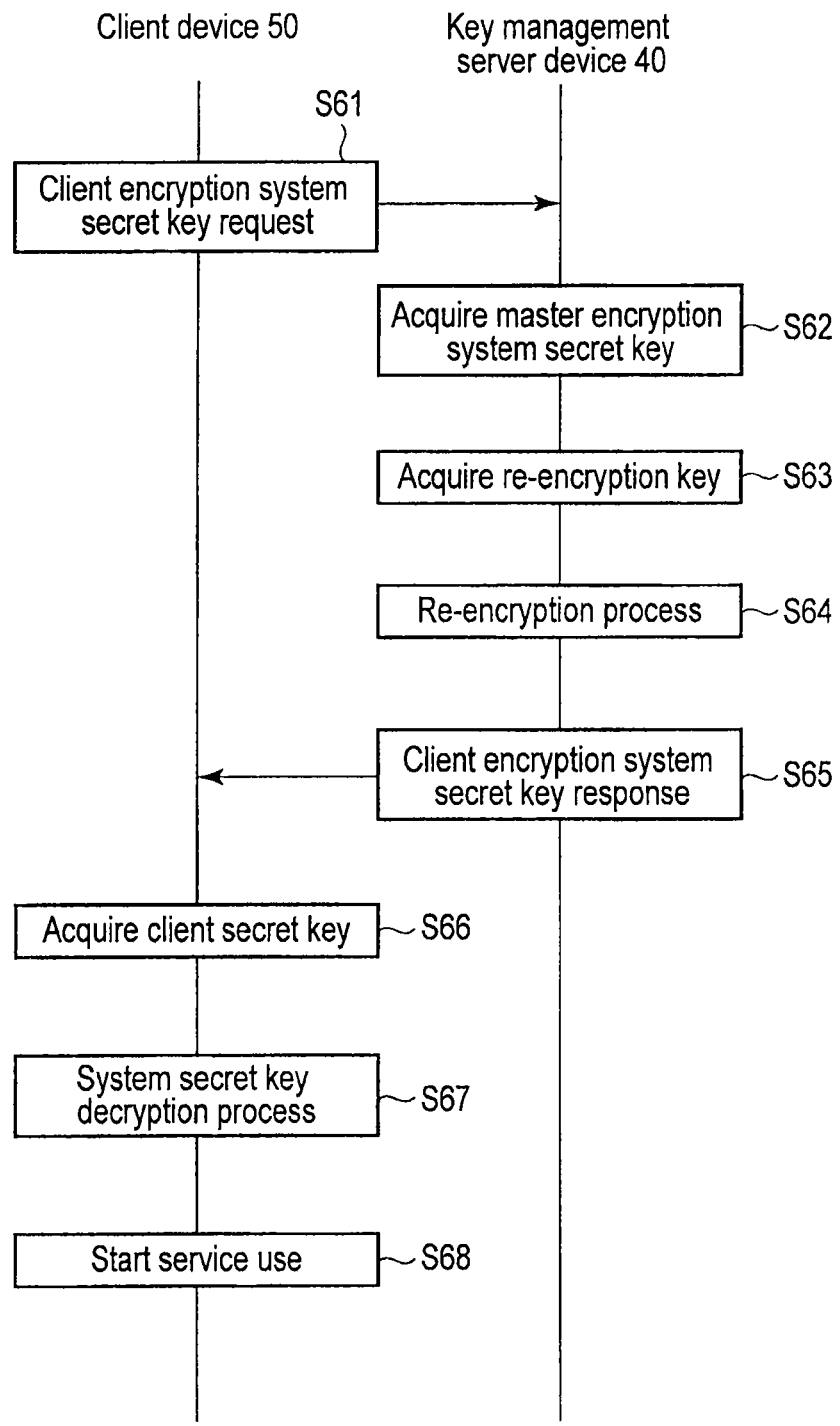
F I G. 12

KEY MANAGEMENT SYSTEM

CROSS REFERENCE TO RELATED APPLICATIONS

This application is a Continuation Application of PCT Application No. PCT/JP2012/053546, filed Feb. 15, 2012 and based upon and claiming the benefit of priority from Japanese Patent Application No. 2011-032078, filed Feb. 17, 2011, the entire contents of all of which are incorporated herein by reference.

FIELD

Embodiments described herein relate generally to a key management system which manages keys for use in encryption or decryption.

BACKGROUND

In general, keys may be needed, for example, for encryption, decryption, and signature in the use of services of various systems (devices). Heretofore, the keys for use in various systems have been independently managed in the respective systems.

In contrast, a method that has recently been drawing attention puts together and manages the keys for use in various systems by one key management server device (key management device) and acquires the keys from the key management server device as required. Product development or specification formulation for such an arrangement has been in progress.

According to this key management server device, the keys managed in the key management server device are distributed to, for example, clients (devices), and the clients can use services of the system by using the keys.

Key management in the arrangement that uses the key management server device to distribute the keys to the clients is described here. In response to a request for a key (for example, a secret key) for use in the system from the client, the key management server device encrypts, for example, the requested secret key (hereinafter referred to as a system secret key) for use in the system for the client, and returns, to the client, the encrypted system secret key included in a response to the request. A possible way of encryption for the client is, for example, encryption based on public key encryption or encryption based on common key encryption that uses a key generated by a key sharing protocol.

When the encrypted system secret key is returned from the key management server device, the encrypted system secret key is decrypted at the client. As a result, the client can use the service of the system by using the decrypted system secret key.

In the meantime, according to the above recent specification that puts together all the keys in the key management server device, the key management server device manages all the system secret keys. Leakage of the system secret keys may have an considerable influence. Therefore, stricter key management is needed in the key management server device than ever.

One possible way is to manage, in the key management server device, the system secret keys by encrypting all these keys with a key (master key) of the key management server device. The master key is, for example, a key (common key) in common key encryption. Thus, even if the system secret keys managed in the key management server device have leaked out, the system secret keys can be protected because these system secret keys are encrypted.

In this case, if a key is requested by a client, the key management server device temporarily decrypts the system secret key under the encryption management with the master key of the key management server device, encrypts the decrypted system secret key for the client as described above, and returns the key to the client. The client decrypts the encrypted system secret key returned from the key management server device as described above. This allows securer distribution of the system secret key to the client.

As described above, the leakage of data (for example, the system secret keys and the master key) in the process of distributing the system secret key to the client (hereinafter referred to as a key distribution process) is a problem, so that the processing and data in this process have to be strictly protected. Therefore, the above key distribution process needs to be performed under a strictly protected environment. In other words, the key distribution process cannot be performed under an environment that is not secure.

When all the keys (for example, system secret keys) are put together in the key management server device, there are more processing and regions (regions to manage the keys) to be protected than before, and key management costs increase proportionately.

Particularly when the master key of the key management server device has leaked out, all the keys (for example, system secret keys) managed in the key management server device can be decrypted. Therefore, the master key needs to be strictly protected by the use of, for example, a secret sharing technique or a password-based encryption method.

However, the strict protection of the master key has to be performed on the key management server device. It is thus obvious that the protection method that is more complicated has a greater influence on the running cost of the key management server device.

BRIEF DESCRIPTION OF THE DRAWINGS

FIG. 3 is a block diagram mainly showing a functional configuration of a master key management device 20 shown in FIG. 1;

FIG. 4 is a block diagram mainly showing a functional configuration of a system device 30 shown in FIG. 1;

FIG. 5 is a block diagram mainly showing a functional configuration of a key management server device 40 shown in FIG. 1;

FIG. 6 is a block diagram mainly showing a functional configuration of a client device 50 shown in FIG. 1;

FIG. 7 is a conceptual diagram illustrating a re-encryption technique for use in the key management system according to the embodiment;

FIG. 9 is a sequence chart showing a processing procedure in a key setup process;

FIG. 11 is a sequence chart showing a processing procedure in a re-encryption key setup process; and FIG. 12 is a sequence chart showing a processing procedure in a key distribution process.

DETAILED DESCRIPTION

In general, according to one embodiment, there is provided a key management system which comprises a master key management device having a first storage unit configured to store a first secret key, and a key management server device having a second storage unit configured to store a second secret key which is encrypted with a first public key which is paired with the first secret key. The master key management device includes a re-encryption key generation unit configured to generate, by using the first secret key stored in the first storage unit and a third public key, a re-encryption key used to re-encrypt the second secret key which is stored in the second storage unit and which is encrypted with the first public key to a second secret key encrypted with the third public key. The key management server device includes a reception unit configured to receive the generated re-encryption key from the master key management device while the master key management device and the key management server device are connected to each other, and a third storage unit configured to store the received re-encryption key. The master key management device and the key management server device are disconnected after the re-encryption key is stored in the third storage unit.

Hereinafter, an embodiment will be described with reference to the drawings.

Figure 1:
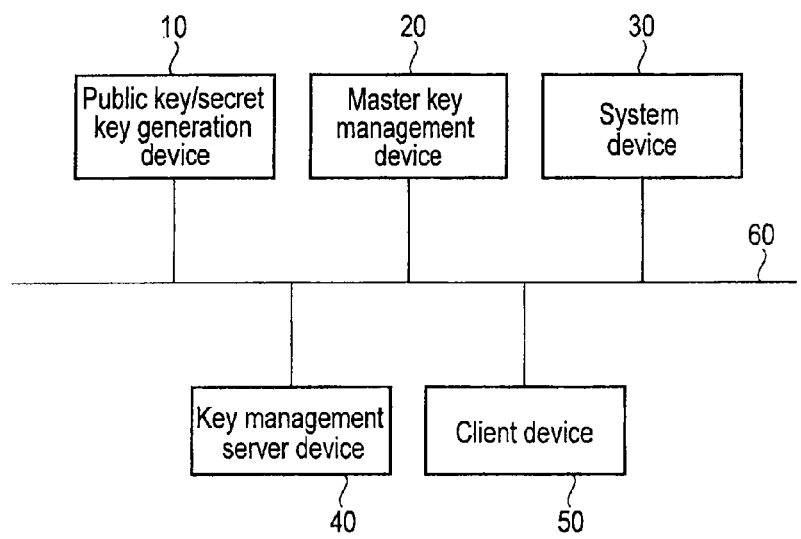
FIG. 1 is a block diagram showing the configuration of a key management system according to an embodiment.

FIG. 1 is a block diagram showing the configuration of a key management system according to the present embodiment. The key management system comprises a public key/secret key generation device 10, a master key management device 20, a plurality of system devices 30, a key management server device 40, and a plurality of client devices 50. In FIG. 1, one system device 30 and one client device 50 are only shown for convenience.

The key management system according to the present embodiment has a function to manage a key (key used in the system device 30) necessary for the use of a service provided by the system device 30 when this key is distributed to the client device 50.

As shown in FIG. 1, the public key/secret key generation device 10, the master key management device 20, the system devices 30, the key management server device 40, and the client devices 50 are connected to one another via, for example, a network 60. As will be described later, the key management system according to the present embodiment is configured so that the master key management device 20 is disconnectable from the network 60. These devices are described below.

The public key/secret key generation device 10, the master key management device 20, the system devices 30, the key management server device 40, and the client devices 50 are obtained as hardware configurations to enable the functions of the respective devices, or as combinational configurations of hardware and software. The software is installed from a storage medium or a network in advance, and comprises a program that causes each device to enable its function.

Figure 2:
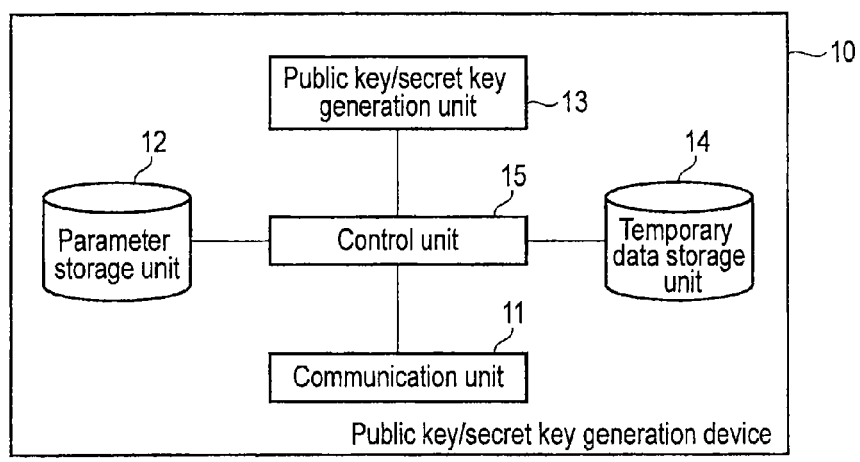
FIG. 2 is a block diagram mainly showing a functional configuration of a public key/secret key generation device 10 shown in FIG. 1.

FIG. 2 is a block diagram mainly showing a functional configuration of the public key/secret key generation device 10 shown in FIG. 1.

The public key/secret key generation device 10 includes a communication unit 11, a parameter storage unit 12, a public key/secret key generation unit 13, a temporary data storage unit 14, and a control unit 15.

Communication unit 11 is a functional unit for communicating via the network 60. Communication unit 11 receives key generation requests from the master key management device 20 and the client devices 50. The key generation request requests the generation of a public key for encrypting various kinds of data and a secret key (secret key paired with the public key) for decrypting the data encrypted with the public key.

A parameter (key generation parameter) for generating the public key and the secret key are stored in the parameter storage unit 12 in advance.

The public key/secret key generation unit 13 generates (pair of) a public key and a secret key in response to the key generation request received by communication unit 11. Here, the public key/secret key generation unit 13 uses the parameter stored in the parameter storage unit 12 to generate the public key and the secret key.

In the following explanation, the public key and the secret key generated in response to the key generation request from the master key management device 20 are referred to as a master public key and a master secret key of the master key management device 20. Likewise, the public key and the secret key generated in response to the key generation request from each of the client devices 50 are referred to as a client public key and a client secret key of the client device 50.

The master public key and the master secret key generated by the public key/secret key generation unit 13 are sent to the master key management device 20 by communication unit 11 as a response to the key generation request from the master key management device 20. Likewise, the client public key and the client secret key generated by the public key/secret key generation unit 13 are sent to the client device 50 by communication unit 11 as a response to the key generation request from the client device 50.

The temporary data storage unit 14 is a functional unit for temporarily storing, for example, data received from other devices as needed.

The control unit 15 is a functional unit for controlling processing in the public key/secret key generation device 10 including processing in communication unit 11 and the public key/secret key generation unit 13.

FIG. 3 is a block diagram mainly showing a functional configuration of the master key management device 20 shown in FIG. 1.

The master key management device 20 includes a communication unit 21, a master secret key storage unit 22, a temporary data storage unit 23, a re-encryption key generation unit 24, and a control unit 25.

Communication unit 21 is a functional unit for communicating via the network 60. Communication unit 21 receives the master public key and the master secret key of the master key management device 20 (i.e., its public key and secret key) sent by, for example, the public key/secret key generation device 10 (communication unit 11 included therein). Communication unit 21 sends a public key request to the client device 50, and receives the public key of the client device 50 as a response to the public key request.

A master secret key (first secret key) which is the secret key of the master key management device 20 received by communication unit 21 is stored in the master secret key storage unit 22. A master public key (first public key) which is the public key of the master key management device 20 received by communication unit 21 is open to the public, and is managed, for example, in the master key management device 20.

The temporary data storage unit 23 is a functional unit for temporarily storing, for example, data received from other devices as needed. For example, the client public key of the client device 50 received by communication unit 21 is stored in the temporary data storage unit 23.

The re-encryption key generation unit 24 generates a re-encryption key by using the master secret key of the master key management device 20 stored in the master secret key storage unit 22 and the client public key (the public key of the client device 50 stored in the temporary data storage unit 23) of the client device 50 received by communication unit 21. This re-encryption key is a key used to re-encrypt (convert) the data encrypted with the public key of the master key management device 20 into data encrypted with the public key of the client device 50. In other words, the re-encryption key is a key for re-encrypting the data decryptable with the master secret key of the master key management device 20 into data decryptable with the client secret key of the client device 50.

The re-encryption key generated by the re-encryption key generation unit 24 is sent to the key management server device 40 by communication unit 21.

The control unit 25 is a functional unit for controlling processing in the master key management device 20 including processing in communication unit 21 and the re-encryption key generation unit 24.

FIG. 4 is a block diagram mainly showing a functional configuration of the system device 30 shown in FIG. 1. Each of the system devices 30 that constitute the key management system has a functional configuration similar to that in FIG. 4.

The system device 30 includes a communication unit 31, a system secret key storage unit 32, a temporary data storage unit 33, a system secret key encryption unit 34, and a control unit 35.

Communication unit 31 is a functional unit for communicating via the network 60. Communication unit 31 sends, for example, a master public key request to the master key management device 20. The master public key request requests the master public key of the master key management device 20. Communication unit 31 receives the master public key of the master key management device 20 from the master key management device 20 as a response to the master public key request sent to the master key management device 20.

A system secret key which is a secret key of the system device 30 (i.e., its secret key) is stored in the system secret key storage unit 32. The system secret key stored in the system secret key storage unit 32 is a key necessary for the use of a service provided by the system device 30. The system secret key may be either a secret key regarding public key encryption or a secret key regarding common key encryption, or may otherwise be confidential data (for example, a password) necessary for the use of a service.

The temporary data storage unit 33 is a functional unit for temporarily storing, for example, data received from other devices as needed. For example, the master public key of the master key management device 20 received by communication unit 31 is stored in the temporary data storage unit 33.

The system secret key encryption unit 34 uses the master public key of the master key management device 20 received by communication unit 31 (the master public key of the master key management device 20 stored in the temporary data storage unit 33) to encrypt the system secret key of the system device 30 stored in the system secret key storage unit 32. The system secret key of the system device 30 encrypted by the system secret key encryption unit 34 with the master public key of the master key management device 20 is sent to the key management server device 40 by communication unit 31.

The control unit 35 is a functional unit for controlling processing in the system device 30 including processing in communication unit 31 and the system secret key encryption unit 34.

FIG. 5 is a block diagram mainly showing a functional configuration of the key management server device 40 shown in FIG. 1.

The key management server device 40 includes a communication unit 41, a master encryption system secret key storage unit 42, a re-encryption key storage unit 43, a re-encryption unit 44, and a control unit 45.

Communication unit 41 is a functional unit for communicating via the network 60. Communication unit 41 receives a master encryption system secret key which is the system secret key of the system device 30 encrypted with the public key of the master key management device 20 sent by the system device 30 (communication unit 31 included therein). Communication unit 41 receives the re-encryption key sent by the master key management device 20 (communication unit 21 included therein).

A system secret key (second secret key) of the system device 30 encrypted with the public key of the master key management device 20 is stored in the master encryption system secret key storage unit 42. The re-encryption key is stored in the re-encryption key storage unit 43.

The re-encryption unit 44 uses the re-encryption key stored in the re-encryption key storage unit 43 to re-encrypt the master encryption system secret key stored in the master encryption system secret key storage unit 42 (i.e., the secret key of the system device 30 encrypted with the public key of the master key management device 20) to the system secret key of the system device 30 encrypted with a client public key (third public key) of the client device 50, thereby generating a client encryption system secret key. That is, the system secret key of the system device 30 re-encrypted by the re-encryption unit 44 can be decrypted by the use of the client secret key of the client device 50.

The system secret key of the system device 30 re-encrypted by the re-encryption unit 44 is sent to the client device 50 by communication unit 31.

The control unit 45 is a functional unit for controlling processing in the key management server device 40 including processing in communication unit 41 and the re-encryption unit 44.

FIG. 6 is a block diagram mainly showing a functional configuration of the client device 50 shown in FIG. 1.

The client device 50 includes a communication unit 51, a client secret key storage unit 52, a temporary data storage unit 53, a system secret key decryption unit 54, and a control unit 55.

Communication unit 51 is a functional unit for communicating via the network 60. Communication unit 51 receives, for example, the client public key and the client secret key of the system device 30 (i.e., its public key and secret key) sent by the public key/secret key generation device 10 (communication unit 11 included therein).

Communication unit 51 sends a client encryption system secret key request to the key management server device 40. The client encryption system secret key request requests the system secret key of the system device 30 which provides the service to be used by (a user of) the client device 50 (a key necessary for the use of the service). Communication unit 51 receives, from the key management server device 40, the client encryption system secret key which is the re-encrypted secret key of the system device 30, as a response to the client encryption system secret key request sent to the key management server device 40. The re-encrypted secret key of the system device 30 is the system secret key of the system device 30 encrypted with the client public key of the client device 50 (i.e., its public key) as described above.

The client secret key of the client device 50 (i.e., its secret key) received by communication unit 51 is stored in the client secret key storage unit 52. The client public key of the client device 50 received by communication unit 51 is open to the public, and is managed in the client device 50.

The temporary data storage unit 53 is a storage unit for temporarily storing, for example, data received from other devices as needed. For example, the re-encrypted system secret key of the system device 30 received by communication unit 51 is stored in the temporary data storage unit 53.

The system secret key decryption unit 54 uses a client secret key (third secret key) of the client device 50 stored in the client secret key storage unit 52 to decrypt the client encryption system secret key (the re-encrypted secret key of the system device 30 stored in the temporary data storage unit 53) which is the re-encrypted system secret key of the system device 30 received by communication unit 51. The system secret key of the system device 30 decrypted by the system secret key decryption unit 54 is stored in the temporary data storage unit 53.

The client device 50 can use the service provided by the system device 30 by the use of the system secret key of the system device 30 decrypted by the system secret key decryption unit 54 (the system secret key of the system device 30 stored in the temporary data storage unit 53).

The control unit 55 is a functional unit for controlling processing in the client device 50 including processing in communication unit 51 and the system secret key decryption unit 54.

Here, the concept of a proxy re-encryption technique used in the key management system according to the present embodiment is described with reference to FIG. 7.

In the case described here, for convenience, confidential data 100 is protected by encryption, and users A and B decrypt the confidential data 100.

First, the confidential data 100 is encrypted by the use of a public key 201 of user A (step S1). As a result, encrypted confidential data 100 (hereinafter referred to as encrypted confidential data 101) is obtained. The public key of user A is a public key attached to user A, and is a key to encrypt the confidential data 100. The public key 201 of user A is open information, and anyone can encrypt data by the use of the public key 201 of user A.

Encrypted confidential data 101 can be decrypted by the use of a secret key 202 of user A (step S2). As a result, user A can obtain the confidential data 100. The secret key 202 of user A is a key paired with the public key 201 of user A attached to user A, and is a key to decrypt the confidential data 100 encrypted with the public key 201 of user A (i.e., encrypted confidential data 101). The secret key of user A is secret information, and a person who knows the secret key 202 of user A alone can decrypt encrypted confidential data 101.

Here, according to the re-encryption technique, a re-encryption key 401 is generated by the use of the secret key 202 of user A and a public key 301 of user B (step S3). The re-encryption key 401 is a key to re-encrypt (convert) encrypted confidential data 101 to encrypted confidential data 102. Encrypted confidential data 102 is the confidential data 100 encrypted with a public key 301 (public key attached to user B) of user B. The generation of the re-encryption key 401 requires the permission of user A to use the secret key of user A.

While the re-encryption key 401 is generated by the use of the secret key 202 of user A and the public key 301 of user B, the re-encryption key 401 may be generated by the use of the public key 201 of user A and a secret key 302 of user B in addition to the keys 202 and 301.

Now, encrypted confidential data 101 is re-encrypted by the use of the re-encryption key 401 (step S4). As a result, encrypted confidential data 101 is re-encrypted to encrypted confidential data 102. Encrypted confidential data 101 cannot be decrypted even by the use of the re-encryption key 401 (i.e., the confidential data 100 cannot be obtained).

The re-encrypted encrypted confidential data 102 (encrypted confidential data 102 obtained by the re-encryption of encrypted confidential data 101) can be decrypted by the use of the secret key 302 of user B (step S5). As a result, user B can obtain the confidential data 100.

As described above, according to the re-encryption technique, for example, encrypted confidential data 101 is not decrypted, and encrypted confidential data 101 (the confidential data 100 encrypted with the public key 201 of user A) can be re-encrypted to encrypted confidential data 102 (the confidential data 100 encrypted with the public key 301 of user B).

Here, symbols used in the proxy re-encryption are described.

The proxy re-encryption is a concept regarding a public key cryptosystem. A basic model comprises five functions: key generation, encryption, decryption, re-encryption key generation, and re-encryption. The key generation, the encryption, and the decryption are similar to those in general public key encryption.

A key generation algorithm KeyGen in the proxy re-encryption inputs a security parameter $1^k$, and outputs a pair (pk, sk) of a public key pk and a secret key sk. That is, KeyGen $(1^k) \rightarrow (pk, sk)$.

An encryption algorithm Enc in the proxy re-encryption inputs a public key $pk_A$ of a target A (for example, user A) and confidential data (plaintext) m, and outputs confidential data (encrypted confidential data) $C_A$ encrypted with the public key $pk_A$ of user A. That is, $Enc(pk_A, m) \rightarrow C_A$.

A decryption algorithm Dec in the proxy re-encryption inputs a secret key $sk_A$ of user A and encrypted confidential data $C_A$, and outputs the confidential data m. That is, $Dec(sk_A, C_A) \rightarrow m$.

A re-encryption key generation algorithm ReKeyGen in the proxy re-encryption inputs, for example, the public key $pk_A$ of user A, the secret key $sk_A$ of user A, a public key $pk_B$ of user B, and a secret key $sk_B$ of user B, and outputs a re-encryption key $rk_{A \rightarrow B}$. That is, $ReKeyGen(pk_A, sk_A, pk_B, sk_B) \rightarrow rk_{A \rightarrow B}$.

A re-encryption algorithm ReEnc in the proxy re-encryption inputs a re-encryption key $rk_{A \rightarrow B}$ and encrypted confidential data $C_A$, and outputs confidential data (encrypted confidential data) $C_B$ encrypted with the public key $pk_B$ of user B. That is, $ReEnc(rk_{A \rightarrow B}, C_A) \rightarrow C_B$.

The basic model comprises the above-mentioned key generation, encryption, decryption, re-encryption key generation, and re-encryption. However, depending on methods to be implemented, the input to the function may be different, or functions or keys other than those mentioned above may be included.

A specific example is a model called non-interactive that does not need $sk_B$ for the input of re-encryption key generation algorithm.

Another model called unidirectional is capable of re-encryption from encrypted confidential data $C_A$ to encrypted confidential data $C_B$ by the use of the re-encryption key $rk_{A \to B}$, but is incapable of re-encryption from encrypted confidential data $C_B$ to encrypted confidential data $C_A$. There is also a model called bidirectional which is capable of mutual re-encryption of encrypted confidential data $C_A$ and encrypted confidential data $C_B$ by the use of the re-encryption key $rk_{A \to B}$. In the bidirectional model, the re-encryption key $rk_{A \to B}$ may be indicated as $rk_{A \leftarrow \to B}$.

Moreover, there is a method based on ID-based encryption among public key encryptions. In this case, functions Setup for master key generation are increased, and a master key and an ID are added to the input of the key generation KeyGen. In the ID-based encryption, the public key pk is an ID.

Now, the operation of the key management system according to the present embodiment is described. In the key management system, the system secret keys of the system devices 30 are managed in a key management server, and the system secret key of the system device 30 is distributed to the client device 50 which is to use the service provided by this system device 30.

A processing procedure of the key management system according to the present embodiment is described with reference to a flowchart in FIG. 8. The processing in the key management system according to the present embodiment is broadly classified into four processes shown in FIG. 8.

In the key management system, a key setup process is first performed (step S11). In this key setup process, the master public key and the master secret key of the master key management device 20 used in the key management system, and the client public key and the client secret key of each client device 50 are set up.

A system secret key setup process is then performed in the key management system (step S12). In the system secret key setup process, the system secret key of each system device 30 is set up for management in the key management server device 40.

Furthermore, a re-encryption key setup process is then performed in the key management system (step S13). In the re-encryption key setup process, the re-encryption key used in the key management system is set up.

After the processes in steps S11 to S13 described above are performed, a key distribution process is performed in the key management system (step S14). In the key distribution process, in response to a request from the client device 50 which is to use the service provided by this system device 30, the encrypted system secret key of the system device 30 is distributed to the client device 50 so that this system secret key can be decrypted with the client secret key of the client device 50. By using the system secret key of the system device 30 distributed by the key distribution process, the client device 50 can use the service provided by the system device 30.

Figure 8:
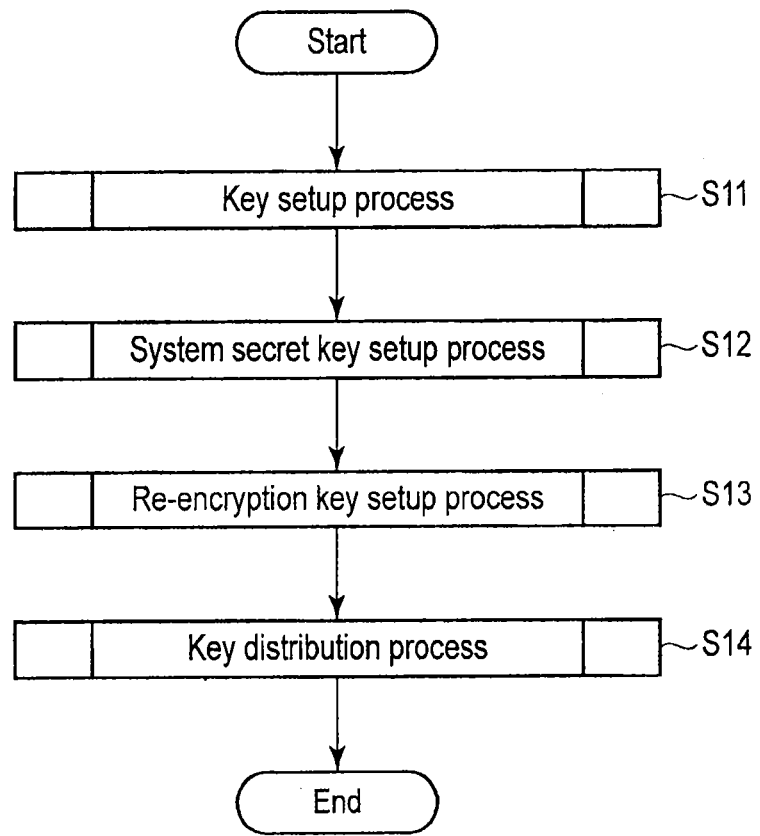
FIG. 8 is a flowchart showing a processing procedure in the key management system according to the embodiment.

Now, details of each of the processes (the key setup process, the system secret key setup process, the re-encryption key setup process, and the key distribution process) shown in FIG. 8 are described with reference to FIG. 9 to FIG. 12. Although not described below, the processes in (the parts included in) the public key/secret key generation device 10, the master key management device 20, each of the system devices 30, the key management server device 40, and each of the client devices 50 are performed under the control of the control units included in the respective devices.

A processing procedure of the key setup process (process in step S11 shown in FIG. 8) is described with reference to a sequence chart in FIG. 9. The key setup process is performed by the public key/secret key generation device 10, the master key management device 20, and each of the client devices 50. In FIG. 9, one client device 50 is only described for convenience.

Communication unit 21 included in the master key management device 20 sends a master key generation request to the public key/secret key generation device 10 (step S21). Accordingly, the public key/secret key generation device 10 is requested to generate the master public key and the master secret key (hereinafter referred to as a master public key Mpk and a master secret key Msk) of the master key management device 20.

Communication unit 11 included in the public key/secret key generation device 10 receives the master key generation request sent from the master key management device 20 (communication unit 21 included therein).

When communication unit 11 receives the master key generation request from the master key management device 20, the public key/secret key generation unit 13 generates a pair of the master public key Mpk and the master secret key Msk of the master key management device 20 (step S22). The public key/secret key generation unit 13 uses the parameter stored in the parameter storage unit 12 to generate the pair of the master public key Mpk and the master secret key Msk of the master key management device 20.

Communication unit 11 sends, to the master key management device 20, a response (master key generation response) to the received key generation request from the master key management device 20 (step S23). The master key generation response includes the master public key Mpk and the master secret key Msk of the master key management device 20 generated by the public key/secret key generation unit 13.

If the master key generation response is sent to the master key management device 20 by the public key/secret key generation device 10 (communication unit 11 included therein), communication unit 21 included in the master key management device 20 receives the master key generation response. Thus, the master key management device 20 acquires the master public key Mpk and the master secret key Msk of the master key management device 20 included in the master key generation response.

The master secret key Msk of the master key management device 20 acquired in the master key management device 20 is stored in the master secret key storage unit 22, and properly saved (step S24).

In the meantime, the master public key Mpk of the master key management device 20 acquired in the master key management device 20 is opened to the public in a proper manner (step S25).

Communication unit 51 included in the client device 50 sends a client key generation request to the public key/secret key generation device 10 (step S26). Accordingly, the public key/secret key generation device 10 is requested to generate the client public key and the client secret key (hereinafter referred to as a client public key Cpk and a client secret key Csk) of the client device 50.

Communication unit 11 included in the public key/secret key generation device 10 receives the client key generation request sent from the client device 50 (communication unit 51 included therein).

When communication unit 11 receives the key generation request from the client device 50, the public key/secret key generation unit 13 generates a pair of the client public key Cpk and the client secret key Csk of the client device 50 (step S27). The public key/secret key generation unit 13 uses the parameter stored in the parameter storage unit 12 to generate the pair of the client public key Cpk and the client secret key Csk of the client device 50.

Communication unit 11 sends, to the client device 50, a response (client key generation response) to the received client key generation request from the client device 50 (step S28). The master key generation response includes the client public key Cpk and the client secret key Csk of the client device 50 generated by the public key/secret key generation unit 13.

When the client key generation response is sent to the client device 50 by the public key/secret key generation device 10 (communication unit 11 included therein), communication unit 51 included in the client device 50 receives the client key generation response. Thus, the client device 50 acquires the client public key Cpk and the client secret key Csk of the client device 50 included in the client key generation response.

The client secret key Csk of the client device 50 acquired in the client device 50 is stored in the client secret key storage unit 52, and properly saved (step S29).

In the meantime, the client public key Cpk of the client device 50 acquired in the client device 50 is opened to the public in a proper manner (step S30).

After the processes in steps S21 to S30 are performed as described above, the key setup process is finished.

For example, IDs for uniquely identifying the devices (the master key management device 20 and the client device 50) which send the master key generation request and the client key generation request may be included in the master key generation request and the client key generation request sent in steps S21 and S26. Alternatively, the public key/secret key generation device 10 may allocate unique IDs to the master key generation request and the client key generation request.

The master key generation request and the client key generation request in steps S21 and S26 and the master key generation response and the client key generation response in steps S23 and S28 may be configured so that the keys are generated not only by one path but also by the exchange of messages as in, for example, TLS protocol which shares keys. The same applies to the requests and responses between the devices described below.

When the master key generation response including the master public key Mpk and the master secret key Msk and the client key generation response including the client public key Cpk and the client secret key Csk are sent in steps S23 and S28, the master secret key Msk and the client secret key Csk need to be protected in particular. For the protection of these secret keys, a common key may be shared by, for example, two devices (here, the public key/secret key generation device 10 and the master key management device 20, or the public key/secret key generation device 10 and the client device 50), and the secret key may be encrypted with this common key and then sent. The common key is a key used in the common key encryption.

Although how to save the master secret key Msk and the client secret key Csk in steps S24 and S29 is not specifically shown, the master secret key Msk and the client secret key Csk may be encrypted with a prepared key and thus saved, for example.

How the master public key Mpk and the client public key Cpk are opened to the public in steps S25 and S30 depends on each device. For example, the public keys may be registered in a server which manages public keys, or may be managed by the manager of the key management system according to the present embodiment. That is, the public keys have only to be available to the devices that constitute the key management system according to the present embodiment when necessary. In the following explanation, for convenience, the master public key Mpk of the master key management device 20 is managed in the master key management device 20, and the client public key Cpk of the client device 50 is managed in the client device 50.

Although the processes in steps S21 to S30 are performed in this order as described with reference to FIG. 9, the processes in steps S21 to S25 and the processes in steps S26 to S30 may be changed in order. The processes in steps S21 to S25 and the processes in steps S26 to S30 do not need to be a series of processes. For example, after the processes in steps S21 to S25 are performed, the processes in steps S26 to S30 may be performed.

Although one client device 50 is only described here for convenience, the processes in steps S26 to S30 shown in FIG. 9 are performed for each of the client devices 50. That is, in the key setup process, steps S26 to S30 may be repeated for each of the client devices 50.

Figure 10:
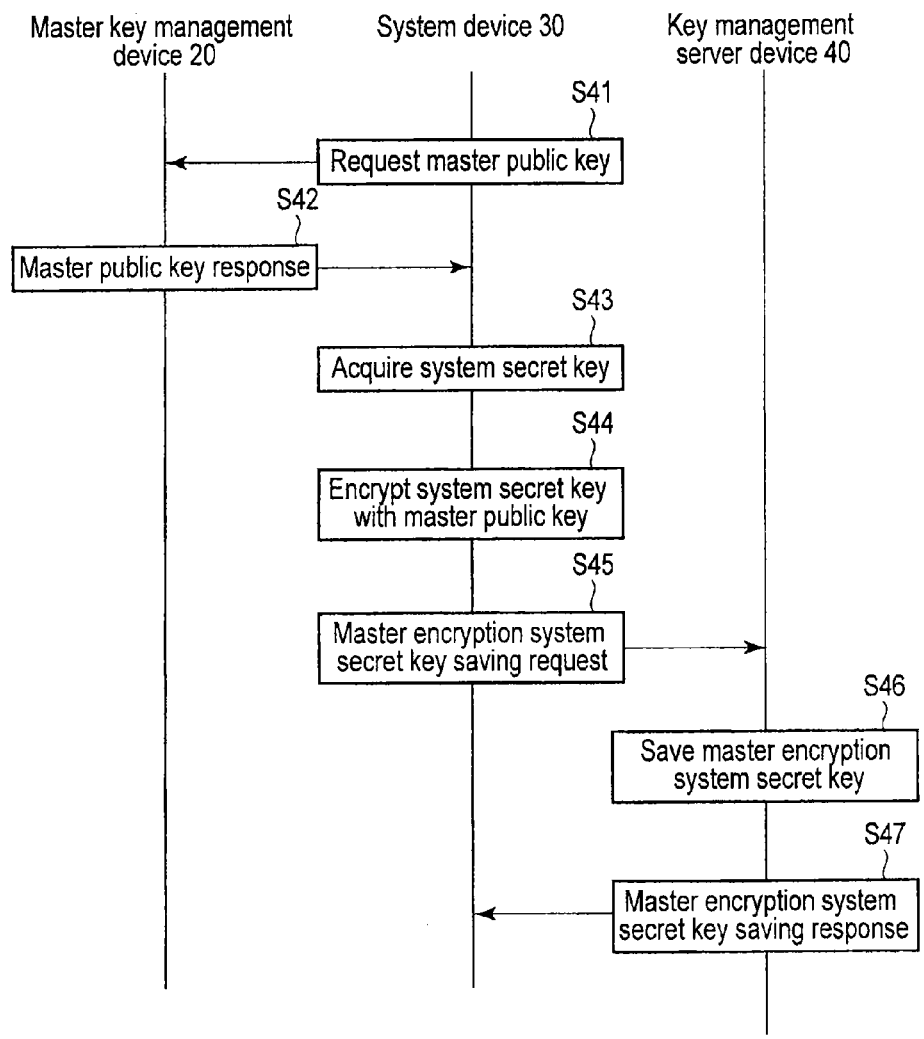
FIG. 10 is a sequence chart showing a processing procedure in a system secret key setup process.

Now, a processing procedure of the system secret key setup process (process in step S12 shown in FIG. 8) is described with reference to a sequence chart in FIG. 10. The system secret key setup process is performed by the master key management device 20, each of the system devices 30, and the key management server device 40. In FIG. 10, one system device 30 is only described for convenience. The system secret key (hereinafter referred to as a system secret key Ssk) of the system device 30 is stored in the system secret key storage unit 32 included in the system device 30.

First, communication unit 31 included in the system device 30 sends a master public key request to the master key management device 20 (step S41). Thus, the master key management device 20 is requested to provide the master public key Mpk of the master key management device 20.

Communication unit 21 included in the master key management device 20 receives the master public key request sent from the system device 30 (communication unit 31 included therein).

When the master public key request from the system device 30 is received by communication unit 21, the master public key Mpk of the master key management device 20 managed in the master key management device 20 is acquired.

Communication unit 21 sends, to the system device 30, a response (master public key response) to the received master public key request from the system device 30 (step S42). The master public key response includes the master public key Mpk of the master key management device 20.

When the master public key response is sent to the system device 30 by the master key management device 20 (communication unit 21 included therein), communication unit 31 included in the system device 30 receives the master public key response. Thus, the system device 30 acquires the master public key Mpk of the master key management device 20 included in the master public key response.

The system secret key encryption unit 34 then acquires the system secret key Ssk of the system device 30 stored in the system secret key storage unit 32 (step S43). Here, when the system secret key Ssk of the system device 30 is, for example, encrypted and thus saved in the system secret key storage unit 32, the system secret key Ssk of the system device 30 is properly decrypted and thereby acquired.

The system secret key encryption unit 34 uses the acquired master public key Mpk of the master key management device 20 to encrypt the system secret key Ssk of the system device 30 acquired in step S43 (step S44).

Communication unit 31 sends, to the key management server device 40, a master encryption system secret key saving request including the master encryption system secret key which is the system secret key Ssk of the system device 30 encrypted in step S44 (step S45). Accordingly, the key management server device 40 is requested to save (manage) the master encryption system secret key.

Communication unit 41 included in the key management server device 40 receives the master encryption system secret key saving request sent from the system device 30 (communication unit 31 included therein). The master encryption system secret key included in the master encryption system secret key saving request received by communication unit 41 is stored and saved in the master encryption system secret key storage unit 42 in response to the master encryption system secret key saving request (step S46).

When the process in step S46 is performed, communication unit 41 sends, to the system device 30, a response (master encryption system secret key saving response) to the received master encryption system secret key saving request to report the completion of the process of saving the master encryption system secret key (step S47).

After the processes in steps S41 to S47 are performed as described above, the process of setting up the system secret key Ssk is finished.

In step S42, the master public key response including the master public key Mpk of the master key management device 20 is sent. However, as the master public key Mpk is information that is opened to the public, it is not necessary to exchange messages as strictly as in the case of various secret keys. The same applies to the processing described below in which various public keys are sent.

Although one system device 30 is only described in FIG. 10 for convenience, the process of setting up the system secret key Ssk shown in FIG. 10 is performed for each of the system devices 30. Thus, the master encryption system secret key which is the system secret key Ssk of the system device 30 encrypted with the master public key Mpk of the master key management device 20 is stored, for each of the system devices 30, in the master encryption system secret key storage unit 42 included in the key management server device 40. That is, in the key management server device 40, the system secret keys Ssk of all the system devices 30 are put together and managed in an encrypted state.

Now, a processing procedure of the re-encryption key setup process (process in step S13 shown in FIG. 8) is described with reference to a sequence chart in FIG. 11. The re-encryption key setup process is performed by the master key management device 20, the key management server device 40, each of the client devices 50. In FIG. 11, one client device 50 is only described for convenience.

First, communication unit 21 included in the master key management device 20 sends a client public key request to the client device 50 (step S51). Thus, the client device 50 is requested to provide the client public key Cpk of the client device 50.

Communication unit 51 included in the client device 50 receives the client public key request sent from the master key management device 20 (communication unit 21 included therein).

When communication unit 51 receives the client public key request sent from the master key management device 20, the client public key Cpk of the client device 50 managed in the client device 50 is acquired.

Communication unit 51 sends, to the master key management device 20, a response (client public key response) to the received client public key request from the master key management device 20 (step S52). The client public key response includes the client public key Cpk of the client device 50.

When the client public key response is sent to the master key management device 20 by the client device 50 (communication unit 51 included therein), communication unit 21 included in the master key management device 20 receives the client public key response. Thus, the master key management device 20 acquires the client public key Cpk of the client device 50 included in the client public key response.

The re-encryption key generation unit 24 then acquires the master secret key Msk of the master key management device 20 stored in the master secret key storage unit 22 (step S53). When the master secret key Msk of the master key management device 20 is, for example, encrypted and thus saved in the master secret key storage unit 22, the master secret key Msk of the master key management device 20 is properly decrypted and thereby acquired.

The re-encryption key generation unit 24 uses the client public key Cpk of the client device 50 and the master secret key Msk of the master key management device 20 that have been acquired to encrypt a re-encryption key (hereinafter referred to as a re-encryption key M→Cree) (step S54). The re-encryption key M→Cree generated here is a key for re-encrypting (converting) data encrypted with the master public key Mpk of the master key management device 20 to data encrypted with the client public key Cpk of the client device 50, that is, a key for re-encrypting data (encrypted data) decryptable with the master secret key Msk of the master key management device 20 to data (encrypted data) decryptable with the client secret key Csk of the client device 50.

Communication unit 21 sends, to the key management server device 40, a re-encryption key saving request including the re-encryption key M→Cree generated in step S54 (step S56). Accordingly, the key management server device 40 is requested to save (manage) the re-encryption key M→Cree.

Communication unit 41 included in the key management server device 40 receives the re-encryption key saving request sent from the master key management device 20 (communication unit 21 included therein). The re-encryption key M→Cree included in the re-encryption key saving request received by communication unit 41 is stored and saved in the re-encryption key storage unit 43 in response to the re-encryption key saving request (step S56).

When the process in step S56 is performed, communication unit 41 sends, to the master key management device 20, a response (re-encryption key saving response) to the received re-encryption key saving request to report the completion of the process of saving the re-encryption key M→Cree (step S57).

After the processes in steps S51 to S57 are performed as described above, the process of setting up the re-encryption key is finished.

In step S55, the re-encryption key saving request including the re-encryption key M→Cree is sent. However, for example, the system secret key Ssk of the system device 30 cannot be obtained by the re-encryption key M→Cree alone. Therefore, as in the case of various public keys described above, it is not necessary to exchange messages as strictly as in the case of various secret keys.

Although one client device 50 is only described in FIG. 11 for convenience, the processes in steps S51 to S55 shown in FIG. 11 are performed for each of the client devices 50. That is, in the re-encryption key setup process, the processes in steps S51 to S55 may be repeated for each of the client devices 50. In this way, the re-encryption key for each of the client devices 50 (re-encryption key corresponding to each of the client devices 50) M→Cree is stored in the re-encryption key storage unit 43 included in the key management server device 40.

Now, a processing procedure of the key distribution process (process in step S14 shown in FIG. 8) is described with reference to a sequence chart in FIG. 12. The key distribution process is performed by the client device 50 which is to use the services provided by the key management server device 40 and the system device 30. Hereinafter, the client device 50 which performs the key distribution process among the client devices 50 is referred to as a target client device 50, and the system device 30 which provides the service to be used by the target client device 50 among the system devices 30 is referred to as a target system device 30.

First, communication unit 51 included in the target client device 50 sends a client encryption system secret key request to the key management server device 40 (step S61). Thus, the key management server device 40 is requested to acquire the client encryption system secret key which is data encrypted so that the system secret key Ssk of the system device 30 can be decrypted with the client secret key Csk of the client device 50.

Communication unit 41 included in the key management server device 40 receives the client encryption system secret key request sent from the target client device 50 (communication unit 51 included therein).

When the client encryption system secret key request from the target client device 50 is received by communication unit 41, the re-encryption unit 44 acquires the encrypted system secret key Ssk of the target system device 30 stored in the master encryption system secret key storage unit 42 in response to the client encryption system secret key request (step S62). The master encryption system secret key acquired from the master encryption system secret key storage unit 42 by the re-encryption unit 44 is the system secret key Ssk of the target system device 30 encrypted with the master public key Msk of the master key management device 20 as described above.

The re-encryption unit 44 acquires the re-encryption key M→Cree stored in the re-encryption key storage unit 43 (step S63). Here, the re-encryption key M→Cree acquired by the re-encryption unit 44 is the re-encryption key M→Cree corresponding to the target client device 50 which is the source of the client encryption system secret key request described above, and is a key for re-encrypting (converting) data encrypted with the master public key Mpk of the master key management device 20 to data encrypted with the client public key Cpk of the client device 50.

The re-encryption unit 44 uses the re-encryption key M→Cree acquired in step S63 to re-encrypt the master encryption system secret key (the secret key of the target system device 30 encrypted with the master public key Mpk of the master key management device 20) acquired in step S62 (step S64). In this case, the system secret key Ssk of the target system device 30 encrypted with the master public key Mpk of the master key management device 20 is re-encrypted to the client encryption system secret key which is the system secret key Ssk of the target system device 30 encrypted with the client public key Cpk of the client device 50 (i.e., data decryptable with the client secret key Csk of the client device 50). The system secret key Ssk of the target system device 30 is not decrypted when the system secret key Ssk of the target system device 30 encrypted with the master public key Mpk of the master key management device 20 is re-encrypted.

Communication unit 41 sends, to the target client device 50 which is the source of the client encryption system secret key request, a response (client encryption system secret key response) to the received client encryption system secret key request (step S65). The client encryption system secret key response includes the client encryption system secret key re-encrypted by the re-encryption unit 44.

When the client encryption system secret key response is sent to the target client device 50 by the key management server device 40 (communication unit 41 included therein), communication unit 51 included in the target client device 50 receives the client encryption system secret key response. Thus, the target client device 50 acquires the client encryption system secret key included in the client encryption system secret key response.

The system secret key decryption unit 54 then acquires the client secret key Csk of the target client device 50 stored in the client secret key storage unit 52 (step S66). Here, when the client secret key Csk of the target client device 50 is, for example, encrypted and thus saved in the client secret key storage unit 52, the client secret key Csk of the target client device 50 is properly decrypted and thereby acquired.

The system secret key decryption unit 54 uses the client secret key Csk of the target client device 50 to decrypt the acquired client encryption system secret key (the secret key of the target system device 30 encrypted with the public key Cpk of the target client device 50) (step S67).

As a result, the client device 50 can acquire the system secret key Ssk of the target system device (i.e., the system device which provides the service to be used) 30. The client device 50 can use the service provided by the target system device 30 by using the acquired system secret key Ssk of the target system device 30.

In step S65, the client encryption system secret key response including the re-encrypted system secret key Ssk of the target system device 30 is sent. However, as, for example, the system secret key Ssk of the target system device 30 is encrypted, it is not necessary to exchange messages so strictly.

Here, as described above, the key distribution process is performed by the client device 50 which requests the system secret key Ssk of the system device 30 and the key management server device 40 (i.e., the client device 50 to which the system secret key of the system device 30 is distributed). That is, the master key management device 20 is not needed in the key distribution process.

Therefore, according to the present embodiment, the master key management device 20 is disconnected from the network 60 during the key distribution process (i.e., during times other than the processes in steps S11 to S13 shown in FIG. 8). More specifically, the re-encryption key M→Cree generated in the master key management device 20 is stored in the re-encryption key storage unit 43 of the key management server device 40, and the re-encryption key setup process is finished, so that the master key management device 20 is disconnected from the other devices. Thus, the master key management device 20 which manages the master secret key Msk of the master key management device 20 can be completely isolated. It is therefore possible to more securely manage the master secret key Msk of the master key management device 20 which can decrypt the system secret keys Ssk of the system devices 30 put together and managed by the key management server device 40.

As described above, according to the present embodiment, the master key management device 20 uses the master secret key Msk of the master key management device 20 and the client public key Cpk of the client device 50 to generate the re-encryption key M→Cree. The key management server device 40 manages the re-encryption key M→Cree generated in the master key management device 20. The master key management device 20 and the key management server device 40 are then disconnected. This configuration enables secure management of distributed keys even under an environment that is not strictly managed.

Specifically, the master secret key Msk of the master key management device 20 which can decrypt the system secret keys Ssk of the system devices 30 put together and managed by the key management server device 40 can be completely isolated and thus managed as described above. It is thus possible to prevent the leakage of the master secret key Msk of the master key management device 20.

According to the present embodiment, the key management server device 40 re-encrypts the system secret key Ssk of the system device 30, and the client device 50 decrypts the re-encrypted system secret key Ssk of the system device 30 with the client secret key Csk of the client device 50. In this configuration, the system secret key Ssk of the system device 30 never emerges as raw data in the process (key distribution process) of distributing the system secret key Ssk of each of the system devices 30 to each of the client devices 50. Therefore, the key management server device 40 does not need to be strictly protected, and the key distribution process can be securely performed even under an environment that is not so secure.

According to the present embodiment, the re-encryption key M→Cree does not need to be generated in response to every request from each of the client devices 50, and has only to be generated before the request (i.e., in the re-encryption key setup process before the key distribution process). Therefore, as described above, the master key management device 20 and the key management server device 40 do not need to be always connected online. Thus, according to the present embodiment, the master key management device 20 which manages data to be protected in particular (here, the master secret key Msk of the master key management device 20) can only be configured to be put under a highly secure environment that is not accessible to the public According to the present embodiment, as described above, the key management server device 40 which performs the key distribution process does not need to be strictly protected. It is therefore possible to reduce the management costs of the key management server device 40 and reduce the costs resulting from the reexamination of the configuration of the key management server device.

Furthermore, according to the present embodiment, as described above, the system secret key Ssk of the system device 30 is not decrypted (i.e., not restored to original key data), for example, in the key management server device 40 in the key distribution process. It is therefore possible to also prevent information leakage to, for example, the manager of the key management server device 40 in the key distribution process.

As described above, according to the present embodiment, division of the processing in the key management system permits highly secure and flexible key management with a high degree of freedom.

Although the system device 30 and the client device 50 are provided in the present embodiment described above, one of the devices (for example, the client device 50) may be only provided. Specifically, for example, the client secret key Csk of the client device 50 may be managed in the key management server device 40, and the managed client secret key Csk of the client device 50 may be distributed in response to a request from each of the client devices 50.

The system device 30 may be separated from the network 60 except when the system setup process in step S12 is performed.

The system device 30 may be configured to have a system secret key generation unit for generating the system secret key Ssk instead of the system secret key storage unit 32, and the system secret key Ssk may be generated by this system secret key generation unit instead of the process of acquiring the system secret key in step S43.

A proxy re-encryption method which is not non-interactive or which is bidirectional or which is ID-based may be used.

Although the public key/secret key generation device 10 is provided in the present embodiment described above, no public key/secret key generation device 10 may be provided. For example, the master public key Mpk and the master secret key Msk of the master key management device 20 may be generated within the master key management device 20, and the client public key Cpk and the client secret key Csk of each of the client devices 50 may be generated within the client device 50.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key management system which comprises a master key management device having a first storage unit configured to store a first secret key, a system device having a secret key storage unit configured to store a second secret key and an encryption unit configured to encrypt the second secret key with a first public key which is paired with the first secret key, and a key management server device having a second storage unit configured to store the second secret key which is encrypted with the first public key and which is received from the system device, the master key management device including
    a re-encryption key generation unit configured to generate, by using the first secret key stored in the first storage unit and a third public key, a re-encryption key used to re-encrypt the second secret key which is stored in the second storage unit and which is encrypted with the first public key to a second secret key encrypted with the third public key,
the key management server device including
    a reception unit configured to receive the generated re-encryption key from the master key management device while the master key management device and the key management server device are connected to each other, and
    a third storage unit configured to store the received re-encryption key,
wherein the master key management device and the key management server device are disconnected after the re-encryption key is stored in the third storage unit.

2. The key management system according to claim 1, further comprising a client device having a fourth storage unit configured to store a third secret key paired with the third public key,
    wherein the key management server device further includes
        a re-encryption unit configured to re-encrypt, by using the re-encryption key stored in the third storage unit, the second secret key which is stored in the second storage unit and which is encrypted with the first public key to a second secret key encrypted with the third public key, and
    the client device includes
        a decryption unit configured to decrypt the re-encrypted second secret key by using the third secret key stored in the fourth storage unit.

3. The key management system according to claim 2, further comprising a key generation device which generates the first secret key and the first public key as well as the third secret key and the third public key, wherein
- the first storage unit stores the first secret key generated by the key generation device,
- the second storage unit stores the second secret key encrypted with the first public key generated by the key generation device,
- the re-encryption key generation unit generates the re-encryption key by using the third public key generated by the key generation device, and the fourth storage unit stores the third secret key generated by the key generation device.

* * * * *